United States Patent
Wilson

(10) Patent No.: US 7,643,831 B2
(45) Date of Patent: Jan. 5, 2010

(54) TELECOMMUNICATIONS SERVICES APPARATUS

(75) Inventor: Jeffrey Wilson, Hampshire (GB)

(73) Assignee: Intellprop Limited, Peter Port, Guernsey (GB)

( * ) Notice: Subject to any disclaimer, the term of this patent is extended or adjusted under 35 U.S.C. 154(b) by 630 days.

(21) Appl. No.: 10/497,224

(22) PCT Filed: Nov. 29, 2002

(86) PCT No.: PCT/GB02/05378

§ 371 (c)(1),
(2), (4) Date: Jan. 18, 2005

(87) PCT Pub. No.: WO03/049461

PCT Pub. Date: Jun. 12, 2003

(65) Prior Publication Data

US 2005/0176433 A1 Aug. 11, 2005

(30) Foreign Application Priority Data

Nov. 30, 2001 (GB) ............................. 0128721.8

(51) Int. Cl.
*H04W 40/00* (2009.01)
(52) U.S. Cl. ....................... 455/445; 455/417
(58) Field of Classification Search .............. 455/417, 455/445, 466, 560, 414.1, 412.1; 379/213.01, 379/70
See application file for complete search history.

(56) References Cited

U.S. PATENT DOCUMENTS 5,937,345 A 8/1999 McGowan et al.
6,131,032 A * 10/2000 Patel .......................... 455/445
6,178,331 B1 * 1/2001 Holmes et al. .............. 455/466
6,405,030 B1 6/2002 Suprunov
6,449,474 B1 * 9/2002 Mukherjee et al. ....... 455/414.2
6,507,735 B1 * 1/2003 Baker et al. ................. 455/445
6,522,655 B1 * 2/2003 Laiho .......................... 455/445
6,654,589 B1 * 11/2003 Haumont ................. 455/67.11
6,748,229 B1 * 6/2004 Calatrava-Requena et al. ... 455/466

FOREIGN PATENT DOCUMENTS

| | | |
|---|---|---|
| EP | 0 941 005 | 9/1999 |
| WO | 99/12364 | 3/1999 |
| WO | 99/17499 | 4/1999 |
| WO | 99/39492 | 8/1999 |
| WO | 00/28773 | 5/2000 |
| WO | 01/80449 | 10/2001 |

OTHER PUBLICATIONS

"Digital Cellular Telecommunications System (Phase 2+): Lawful Interception; Stage 2(3GPP TS 43.033 version 4.0.0 Release 4)" ETSI TS 143 033 V4. Mar. 2001, pp. 1-25.

* cited by examiner

*Primary Examiner*—Erika A Gary
(74) *Attorney, Agent, or Firm*—Renner, Otto, Boisselle & Sklar, LLP

(57) ABSTRACT

In a mobile telephone system, a call routing equipment such as an SMS Router (18) receives a routing information request signal (SRI_SM) indicative of a communication such as a text message intended for a mobile terminal (10), and returns a routing information response signal (False Response) indicative of the SMS Router (18) instead of being indicative of the intended mobile terminal (10). This allows processing (Copy sent via TCP/IP) of the resulting text message (MTForwardSM) by the SMS Router (18), such as archiving of the text message, sending the text message to an email address, and/or forwarding the text message to an alternative destination.

15 Claims, 3 Drawing Sheets

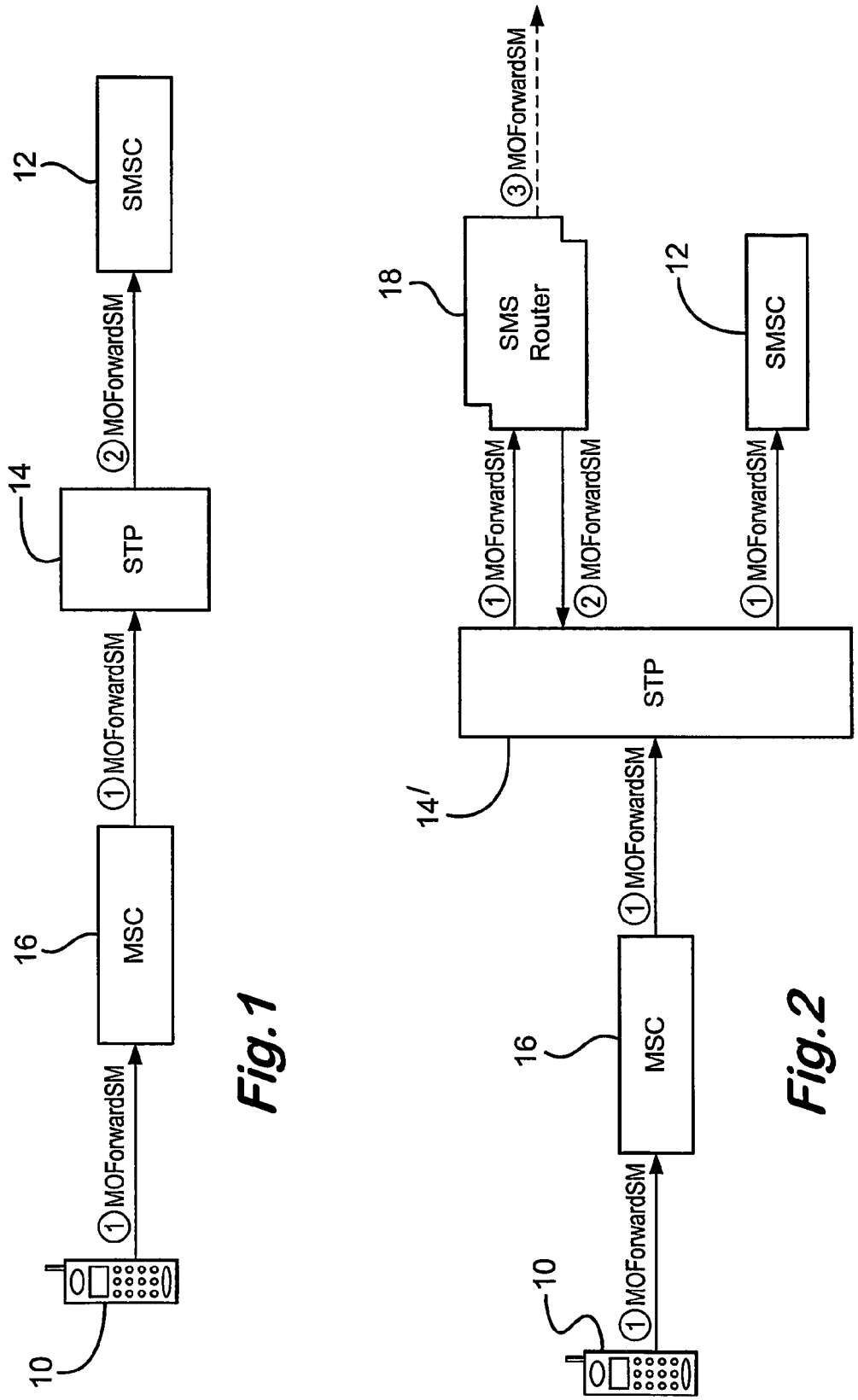

TELECOMMUNICATIONS SERVICES APPARATUS

This application is a national phase of International Application No. PCT/GB02/05378 filed Nov. 29, 2002 and published in the English language, which claims priority of United Kingdom Application No. 0128721.8, filed Nov. 30, 2001.

This invention concerns the field of mobile telecommunications and in particular the areas of voice and text communication. More specifically the invention relates to telecommunications services apparatus for use with a mobile telephone system, and to methods of processing telephone communications by means of such apparatus. The invention is applicable in particular to the GSM (Global System for Mobile Communications) telephony system, although in principle the technique could be applied to other types of mobile network.

GSM is well defined and specified by international standards, which define the functional blocks and the signalling messages that pass between them. GSM provides the Short Message Service (SMS) facility which allows short text messages to be sent between mobile stations. Message transmission occurs in two stages, the first being transmission of the message from the originating handset to a short message service centre (SMSC). Secondly, the SMSC then forwards the message to the destination mobile station. If the destination mobile station is unavailable then the SMSC stores the message and retries delivery later.

It is known that short messages may be archived by transferring them from a handset into a computer using a data link and specialised software. However this process is slow and inconvenient.

It is known that Signalling Transfer Points (STPs) in the network are programmed to do address translation between global addresses and the addresses of specific equipments or groups of equipments. The STPs provide a level of indirection in network addressing.

According to one aspect of the invention there is provided a telecommunications services apparatus for use with a mobile telephone system, the apparatus comprising call routing means operable:

to receive a routing information request signal indicative of a telephone communication intended for a mobile terminal;

to return a routing information response signal indicative of the telecommunications services apparatus instead of being indicative of the intended mobile terminal; and to allow processing of the resulting telephone communication by the telecommunications services apparatus.

According to another aspect of the invention there is provided a method of processing a telephone communication by means of a telecommunications services apparatus in a mobile telephone system, the method comprising:

receiving a routing information request signal in a call routing means, the routing information request signal being indicative of a telephone communication intended for a mobile terminal;

returning a routing information response signal indicative of the telecommunications services apparatus instead of being indicative of the intended mobile terminal; and allowing processing of the resulting telephone communication.

Further aspects of the invention provide a computer program for carrying out the above method, and a storage medium on which such computer program is stored.

The GSM short message service is extremely popular and carries ever increasing levels of traffic world-wide. A large proportion of this traffic is ephemeral. However in some cases it would be desirable to be able to keep a permanent record of short messages, either sent or received. With the present GSM system this is difficult. Another useful but currently unavailable facility would be SMS diversion whereby short messages could be received on an alternative handset or diverted to a host system which could act upon the contents of a message. A preferred embodiment of the present invention addresses both of these problems and opens up the possibility of many new types of service with both text (such as GSM) and voice calls. Examples of such uses include:

Sending copies of Short Messages either transmitted or received by a subscriber to an email system for archiving purposes.

Diversion of SMS to an alternative handset or to an equipment. e.g. for voice read-back.

Lawful interception of SMS.

Interception of incoming or outgoing voice calls for a subscriber for the purpose of, for example, recording the call.

The invention will now be described by way of example with reference to the accompanying drawings, throughout which like parts are referred to by like references, and in which:

FIG. 1 is a block diagram showing normal delivery of a mobile originated message to a short message service centre (SMSC);

FIG. 2 is a block diagram showing intercepted delivery of a mobile originated message;

Figure 3:
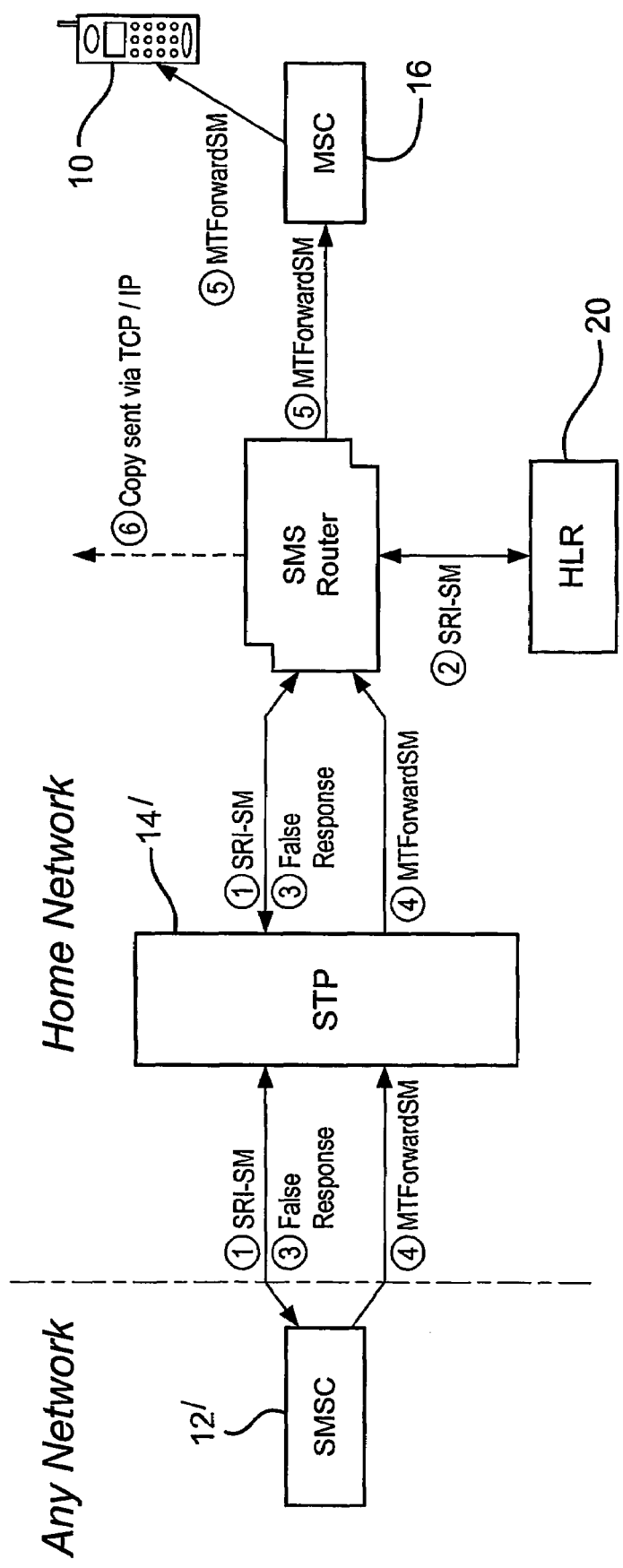
FIG. 3 is a block diagram showing intercepted delivery of a mobile terminated message.

It is desired to obtain access to the contents of all text messages (such as SMS messages) delivered to or transmitted by subscribers of a given network, or to obtain access to the audio of all calls involving subscribers of a given network, by arranging for these communications to pass through an equipment or group of equipments. As will be described, access to mobile originated (MO) messages is straightforward using known techniques, but access to mobile terminated (MT) messages is not possible using present techniques. For voice calls, diversion of outgoing calls via an equipment is currently possible by the subscriber dialling a special number or code which causes the network to route the call accordingly. However diversion of incoming calls through an equipment is not possible using known techniques. The technique to be described allows access to mobile terminated messages and to incoming calls. The ability to direct all messages or voice calls through a common equipment is very powerful and opens the possibility of a whole range of new applications.

The following description is in the context of SMS messages.

Two types of message need to be considered, namely those that are mobile originated. i.e. sent by the subscriber, and those that are mobile terminated, i.e. received by the subscriber. In the mobile originated case, it is known that all messages sent by the subscriber will be delivered to the Short Message Service Centre (SMSC) in the subscriber's home network. It is also known that STPs can be programmed to divert all mobile originated messages through an equipment for processing prior to being delivered to the SMSC.

A suitable equipment for implementing the message processing is a Telsis($^{RTM}$) SMS Router, manufactured by Telsis Limited. This equipment may connect to mobile telephone networks using known and standardised signalling protocols including SS7 and TCP/IP. Using known signalling routing techniques, the mobile network can arrange for SMS messages directed to the network's SMSCs to be routed via the SMS Router. The SMS Router is said to be in-line with the SMSC's message reception.

The global GSM system consists of a number of GSM networks. The network on which a subscriber is registered is known as his "home" network. Referring to FIG. 1, when a subscriber sends a text message from a handset 10, the message is always delivered in the first instance to an SMSC 12 in his home network. This is the case even when the subscriber is roaming on another network. The SMSC 12 then queries the (not shown) Home Location Register (HLR) of the destination subscriber's network and the message is then forwarded accordingly.

The global address of the SMSC 12 is normally programmed into the subscriber's handset. This global address is interpreted by Signalling Transfer Points (STPs) 14 in the GSM network in order to deliver the message to the appropriate equipment. The GSM network messaging involved in delivering a mobile originated (MO) message to the SMSC 12 is shown in FIG. 1, the mobile originated message (MOForwardSM) being sent from the handset 10 via a mobile switching centre (MSC) 16 and the STP 14 to the SMSC 12.

STPs in the home network can be re-programmed to divert all mobile originated short messages to an alternative equipment or group of equipments which can process short messages before passing them on to the SMSC 12, as shown in FIG. 2. This equipment then forwards the message (MOForwardSM) onto the SMSC 12. In this way an SMS Router 18 is able to intercept all SMS traffic arriving at the SMSC 12, by way of the STP 14'. The SMS Router 18 is therefore in a position where it is able to implement any type of processing on the SMS message, for example copying (3) to an email archive.

The mobile terminated (MT) message processing case is more difficult because there is no guarantee that in normal circumstances messages delivered to a subscriber's handset will pass through the subscriber's home network at all. Solution of this problem is the key to this technique. It is known that in order to deliver a message to a subscriber, a query must be made to the HLR of the subscriber's home network in order to determine the current location of the subscriber. In the case of short messages this query is known as "send routing information for short message" or SRI_SM. It is also known that STPs can be programmed to divert signalling messages to an alternative destination. In some cases it is possible to divert SRI_SM messages (and the SRI equivalent messages to voice calls) without diverting other types of messages. The preferred embodiment of the present invention makes use of this diversion by sending SRI_SM messages to the SMS Router. With reference to FIG. 3, which shows intercepted delivery of a mobile terminated message, the SMS Router 18 is then able to reply to this query (SRI_SM) on behalf of the HLR 20. However instead of returning the location of the subscriber, the SMS Router 18 can return its own location (False Response). The effect of this is that the short message (MTForwardSM) will be delivered from the SMSC 12' not to the subscriber but to the SMS Router 18. This is true regardless of the current locations of either the sender or the recipient. The SMS Router 18 is then able to implement any desired processing on the text message, for example archiving to email (Copy sent via TCP/IP), before finally forwarding the message (MTForwardSM) onto the actual location of the handset 10 of the subscriber as indicated on the HLR 20. This technique is illustrated in FIG. 3 and the corresponding ladder diagram of FIG. 4.

Figure 4:
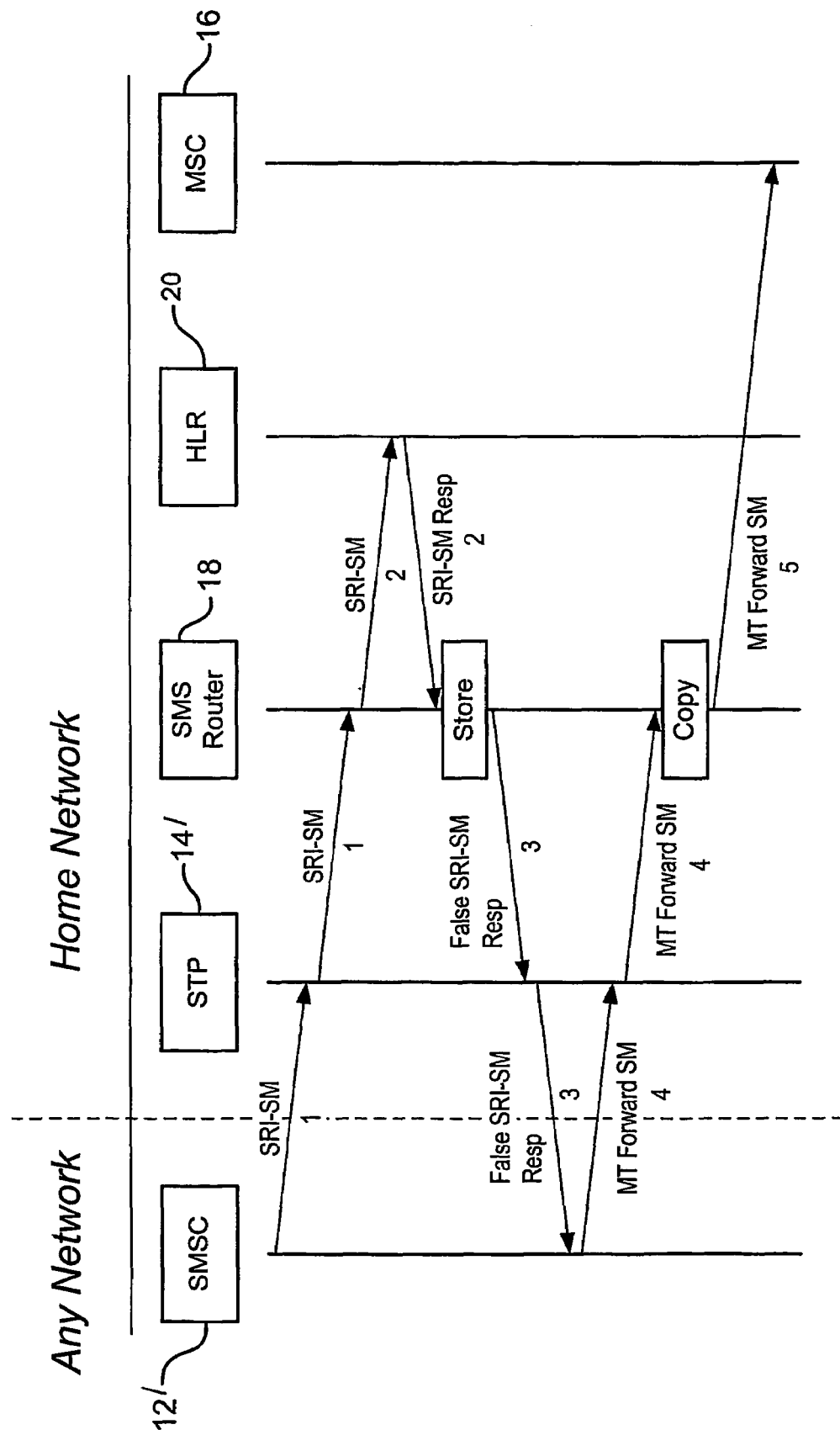
FIG. 4 is a ladder diagram of an intercepted mobile terminated message.

In FIG. 4, the HLR query (2) is shown being made immediately the SRI_SM message arrives at the SMS Router. In practice, since the HLR response is not used until step (5), the HLR query may be delayed until after step (3), or delayed until after step (4). The reply may be sent before or after the HLR is queried, and before or after the HLR response is received.

The combined effect of using the presently known technique for mobile originated (MO) SMS and using the present invention for mobile terminated SMS is that all messages to and from a subscriber may be caused to pass through an SMS Router before reaching their destination. The SMS Router is capable of acting on the contents or addresses within the message to provide additional intelligent functionality in the network such as message archiving or grooming, sending the message to an email address, and/or forwarding the message to an alternative destination.

Very similar techniques can be used for voice calls. Instead of the SRI-SM message used for SMS, voice calls are delivered to the correct mobile station using an SRI message (Send Routing Information) directed at the HLR. If the STPs are programmed to divert SRI messages to the SMS Router, then the same principle can be used to cause incoming voice calls to be diverted via for example, call screening equipment a recording equipment which could make a recording in the manner described in PCT Patent Application Publication No. WO 02/32092, or any other enhanced voice service. Outgoing voice calls may be diverted to the equipment by known techniques, for example the use of short dialling prefixes.

Whereas the invention has been described in the context of SMS text messaging systems, it could equally be applied to other messaging systems, for example enhanced messaging services (EMS), multimedia messaging services (MMS) and the like.

In so far as the embodiments of the invention described above may be implemented, at least in part, using software-controlled processing apparatus, it will be appreciated that a computer program providing such software control and a storage medium by which such a computer program is stored are envisaged as aspects of the invention.

Glossary

| | |
|---|---|
| SMS | Short Message Service of the GSM mobile telephone system |
| SMSC | Short Message Service Centre |
| SMS Router | Equipment which embodies the invention and filters and responds to certain signalling messages. |
| HLR | Home Location Register |

The invention claimed is:

1. A telecommunications services apparatus for use with a mobile telephone system having a home location register and sending and receiving networks, wherein the sending network and the receiving network are based on the same telecommunications standard, the apparatus comprising routing means operable:

to receive a routing information request signal indicative of a telephone communication intended for a mobile terminal, the routing information request signal having been diverted away from the home location register; and to return a routing information response signal indicative of the telecommunications services apparatus instead of being indicative of the intended mobile terminal, so as to allow processing of the resulting telephone communication by the telecommunications services apparatus.

2. Apparatus according to claim 1, wherein the routing means is operable to forward the resulting telephone communication.

3. Apparatus according to claim 2, wherein the routing means is operable to obtain information concerning the location of the intended mobile terminal from the home location register, and to forward the resulting telephone communication to the intended mobile terminal.

4. Apparatus according to claim 1, wherein the telephone communication is a telephone text message.

5. Apparatus according to claim 4, wherein the processing of the telephone communication comprises archiving of the text message.

6. Apparatus according to claim 4, wherein the processing of the telephone communication comprises sending the text message to an e-mail address.

7. Apparatus according to claim 4, wherein the processing of the telephone communication comprises forwarding the text message to an alternative destination.

8. Apparatus according to claim 1, wherein the telephone communication is a voice call.

9. Apparatus according to claim 8, wherein the processing of the telephone communication comprises interception of the voice call.

10. Apparatus according to claim 8, wherein the processing of the telephone communication comprises recording the voice call.

11. A method of processing a telephone communication by means of a telecommunications services apparatus in a mobile telephone system having a home location register and sending and receiving networks, wherein the sending network and the receiving network are based on the same telecommunications standard, the method comprising:
  receiving a routing information request signal in a routing means, the routing information request signal being indicative of a telephone communication intended for a mobile terminal, the routing information request signal having been diverted away from the home location register;
  returning a routing information response signal indicative of the telecommunications services apparatus instead of being indicative of the intended mobile terminal; and
  allowing processing of the resulting telephone communication.

12. A method according to claim 11, including forwarding the resulting telephone communication.

13. A method according to claim 12, including obtaining information concerning the location of the intended mobile terminal from the home location register in the mobile telephone system, and forwarding the resulting telephone communication to the intended mobile terminal.

14. A computer readable medium encoded with computer executable instructions for processing a telephone communication by means of a telecommunications services apparatus in a mobile telephone system having a home location register and sending and receiving networks, wherein the sending network and the receiving network are based on the same telecommunications standard, the instructions comprising code for:
  receiving a routing information request signal in a routing means, the routing information request signal being indicative of a telephone communication intended for a mobile terminal, the routing information request signal having been diverted away from the home location register;
  returning a routing information response signal indicative of the telecommunications services apparatus instead of being indicative of the intended mobile terminal; and
  allowing processing of the resulting telephone communication.

15. A storage medium storing a computer program for implementing by means of a telecommunications services apparatus in a mobile telephone system having a home location register and sending and receiving networks, wherein the sending network and the receiving network are based on the same telecommunications standard, the method comprising:
  receiving a routing information request signal in a routing means, the routing information request signal being indicative of a telephone communication intended for a mobile terminal, the routing information request signal having been diverted away from the home location register;
  returning a routing information response signal indicative of the telecommunications services apparatus instead of being indicative of the intended mobile terminal; and
  allowing processing of the resulting telephone communication.

* * * * *